(12) United States Patent
Ma et al.

(10) Patent No.: US 10,552,507 B2
(45) Date of Patent: Feb. 4, 2020

(54) APPLICATION INTERFACE UPDATE METHOD, APPARATUS AND SYSTEM

(71) Applicant: NETEASE LEDE TECHNOLOGY CO., LTD., Hangzhou (CN)

(72) Inventors: Qing Ma, Hangzhou (CN); Wenxuan Jia, Hangzhou (CN); Junyao Chen, Hangzhou (CN); Baoxiang Ma, Hangzhou (CN); Shupeng Wang, Hangzhou (CN)

(73) Assignee: Lede Technology Co., Ltd., Hangzhou (CN)

( * ) Notice: Subject to any disclaimer, the term of this patent is extended or adjusted under 35 U.S.C. 154(b) by 374 days.

(21) Appl. No.: 14/667,251

(22) Filed: Mar. 24, 2015

(65) Prior Publication Data

US 2015/0278280 A1 Oct. 1, 2015

(30) Foreign Application Priority Data

Mar. 27, 2014 (CN) .......................... 2014 1 0121017

(51) Int. Cl.
*G06F 16/955* (2019.01)
*H04L 29/08* (2006.01)

(52) U.S. Cl.
CPC ........ *G06F 16/955* (2019.01); *H04L 67/2857* (2013.01)

(58) Field of Classification Search
CPC ...................................................... G06F 8/65

(Continued)

(56) References Cited

U.S. PATENT DOCUMENTS

| 2002/0122070 | A1* | 9/2002 | Watanabe | G06F 3/0482 |
| | | | | 715/810 |
| 2003/0095142 | A1* | 5/2003 | Patrizio | G06F 9/4443 |
| | | | | 715/744 |

(Continued)

FOREIGN PATENT DOCUMENTS

| CN | 101742068 A | 6/2010 |
| CN | 101996068 A | 3/2011 |

(Continued)

OTHER PUBLICATIONS

The State Intellectual Property Office of China, First Notification of Office Action issued for counterpart Chinese Patent Application No. 210410121017.2, dated Aug. 22, 2016, 10 pp.

(Continued)

*Primary Examiner* — Sm A Rahman
*Assistant Examiner* — Chen-Liang Huang
(74) *Attorney, Agent, or Firm* — Fitch, Even, Tabin & Flannery, LLP

(57) ABSTRACT

The embodiments of the present invention provide an application interface update method, apparatus and system. One method includes: monitoring interface update data on the server side during the running of a client; receiving the monitored interface update data; and updating the current application interface according to said interface update data, thereby rendering an updated application interface; wherein, buttons in said current application interface are different from buttons in said updated application interface, and/or the arrangement of buttons in said current application interface is different from the arrangement of buttons in said updated application interface.

9 Claims, 7 Drawing Sheets

(58) Field of Classification Search
USPC .......................................................... 709/219
See application file for complete search history.

(56) References Cited

U.S. PATENT DOCUMENTS

| | | | | |
|---|---|---|---|---|
| 2003/0137540 | A1* | 7/2003 | Klevenz | G06F 9/451 |
| | | | | 715/762 |
| 2004/0242269 | A1* | 12/2004 | Fadell | G06F 3/0238 |
| | | | | 455/556.2 |
| 2006/0277469 | A1* | 12/2006 | Chaudhri | G06F 3/04817 |
| | | | | 715/709 |
| 2007/0067269 | A1* | 3/2007 | Rudge | G06F 9/4443 |
| 2007/0150601 | A1* | 6/2007 | Angelica | G06Q 30/0601 |
| | | | | 709/227 |
| 2007/0244745 | A1* | 10/2007 | Boal | G06Q 30/02 |
| | | | | 705/14.26 |
| 2008/0183801 | A1* | 7/2008 | Marton | H04L 67/306 |
| | | | | 709/203 |
| 2009/0132578 | A1* | 5/2009 | Parikh | G06F 9/4443 |
| 2013/0055350 | A1* | 2/2013 | Belanger | G06F 21/31 |
| | | | | 726/3 |

FOREIGN PATENT DOCUMENTS

| | | |
|---|---|---|
| CN | 103176825 A | 6/2013 |
| WO | 02077876 A2 | 10/2002 |

OTHER PUBLICATIONS

The State Intellectual Property Office of China, Search Report issued for counterpart Chinese Patent Application No. 201410121017.2, dated Aug. 22, 2016, 4 pp.

* cited by examiner

APPLICATION INTERFACE UPDATE METHOD, APPARATUS AND SYSTEM

CROSS-REFERENCE TO RELATED APPLICATIONS

This application claims the benefit and priority of Chinese patent application CN201410121017.2 filed on Mar. 27, 2014. The entire disclosure of the above application is incorporated herein by reference.

TECHNICAL FIELD

The embodiments of the present invention relate to the field of information processing technology, and more particularly, to an application interface update method, apparatus and system.

BACKGROUND

This section is intended to provide the background or context for the embodiments of the present invention as recited in the claims. What is described herein is not admitted to be prior art by inclusion in this section.

In order to achieve interaction with users, applications provide application interfaces so as to interact with the users through the application interfaces. Buttons (e.g., tabs) are typically provided on an application interface for a user to achieve application interface switching by performing operations which trigger the buttons.

After the release of an initial version of a client application, in order to adjust the actions which can be triggered by the user on the application interface, the application interface needs to be updated so as to adjust the buttons on the application interface.

In the prior art, in order to adjust the buttons on the application interface, the provider of the application needs to release to the user a new version developed for the adjustment of the buttons, and the user has to download and install the new version to complete the interface update so as to use an application interface with adjusted buttons.

SUMMARY

In this context, the embodiments of the present invention aim to provide an application interface update method, apparatus and system.

In a first aspect of the embodiments of the invention, there is provided an application interface update method applied to a client, including: monitoring interface update data on the server side during the running of said client; receiving the monitored interface update data; and updating the current application interface according to said interface update data, thereby rendering an updated application interface; wherein, buttons in said current application interface are different from buttons in said updated application interface, and/or the arrangement of buttons in said current application interface is different from the arrangement of buttons in said updated application interface.

In a second aspect of the embodiments of the invention, there is provided an application interface update method applied to a server, including: generating interface update data for a client; and sending the interface update data to said client for said client to receive, while monitoring said interface update data on the server side during the running of said client, the monitored interface update data, and update the current application interface according to said interface update data, thereby rendering an updated application interface; wherein, buttons in said current application interface are different from buttons in said updated application interface, and/or the arrangement of buttons in said current application interface is different from the arrangement of buttons in said updated application interface.

In a third aspect of the embodiments of the invention, there is provided an application interface update method applied to a client, including: obtaining interface update data encapsulated in said client in response to monitoring that a triggering condition for interface update is met during the startup of said client; and updating the current application interface according to said interface update data, thereby rendering an updated application interface; wherein, buttons in said current application interface are different from buttons in said updated application interface, and/or the arrangement of buttons in said current application interface is different from the arrangement of buttons in said updated application interface.

In a fourth aspect of the embodiments of the invention, there is provided an application interface update apparatus configured on a client, including: an update monitoring module for monitoring interface update data on the server side during the running of said client; an update receiving module for receiving the monitored interface update data; and an update rendering module for updating the current application interface according to said interface update data, thereby rendering an updated application interface; wherein, buttons in said current application interface are different from buttons in said updated application interface, and/or the arrangement of buttons in said current application interface is different from the arrangement of buttons in said updated application interface.

In a fifth aspect of the embodiments of the invention, there is provided an application interface update apparatus configured on a server, including: an update generating module for generating interface update data for a client; and an update sending module for sending the interface update data to the client for said client to receive, while monitoring said interface update data on the server side during the running of said client, the monitored interface update data, and update the current application interface according to said interface update data, thereby rendering an updated application interface; wherein, buttons in said current application interface are different from buttons in said updated application interface, and/or the arrangement of buttons in said current application interface is different from the arrangement of buttons in said updated application interface.

In a sixth aspect of the embodiments of the invention, there is provided an application interface update apparatus configured on a client, including: an update obtaining module for obtaining interface update data encapsulated in said client in response to monitoring that a triggering condition for interface update is met during the startup of said client; and an update rendering module for updating the current application interface according to said interface update data, thereby rendering an updated application interface; wherein, buttons in said current application interface are different from buttons in said updated application interface, and/or the arrangement of buttons in said current application interface is different from the arrangement of buttons in said updated application interface.

In a seventh aspect of the embodiments of the invention, there is provided an application interface update system including a client and a server, wherein said client is configured with the apparatus provided by the fourth aspect of the embodiments of the invention, and said server is configured with the apparatus provided by the fifth aspect of the embodiments of the invention.

In an eighth aspect of the embodiments of the invention, a system is provided, wherein the system for example can include one or more processing devices, and one or more non-transitory machine-readable media configured to store instructions that are executable by the one or more processing devices to perform operations including: monitoring interface update data on the server side during the running of said client; receiving the monitored interface update data; and updating the current application interface according to said interface update data, thereby rendering an updated application interface; wherein, buttons in said current application interface are different from buttons in said updated application interface, and/or the arrangement of buttons in said current application interface is different from the arrangement of buttons in said updated application interface.

In a ninth aspect of the embodiments of the invention, a system is provided, wherein the system for example can include one or more processing devices, and one or more non-transitory machine-readable media configured to store instructions that are executable by the one or more processing devices to perform operations including: generating interface update data for a client; and sending the interface update data to said client for said client to receive, while monitoring said interface update data on the server side during the running of said client, the monitored interface update data, and update the current application interface according to said interface update data, thereby rendering an updated application interface; wherein, buttons in said current application interface are different from buttons in said updated application interface, and/or the arrangement of buttons in said current application interface is different from the arrangement of buttons in said updated application interface.

In a tenth aspect of the embodiments of the invention, a system is provided, wherein the system for example can include one or more processing devices, and one or more non-transitory machine-readable media configured to store instructions that are executable by the one or more processing devices to perform operations including: obtaining interface update data encapsulated in said client in response to monitoring that a triggering condition for interface update is met during the startup of said client; and updating the current application interface according to said interface update data, thereby rendering an updated application interface; wherein, buttons in said current application interface are different from buttons in said updated application interface, and/or the arrangement of buttons in said current application interface is different from the arrangement of buttons in said updated application interface.

BRIEF DESCRIPTION OF THE DRAWINGS

The above and other objects, features and advantages of exemplary embodiments of the invention will become more readily understandable by reading the following detailed description with reference to the accompanying drawings. A number of embodiments of the invention are shown in an exemplary and unrestrictive manner in the drawings, of which.

In the drawings, identical or corresponding numerals represent identical or corresponding parts.

DETAILED DESCRIPTION OF THE INVENTION

Figure 1:
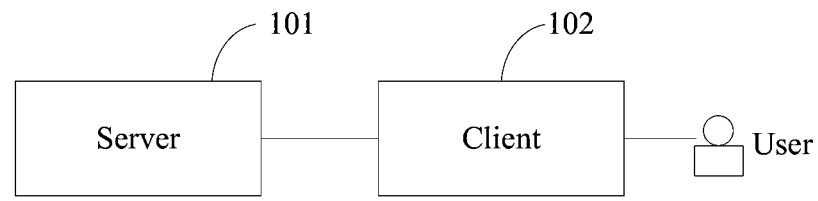
FIG. 1 schematically illustrates a framework diagram of an exemplary application scenario, in accordance with the embodiments of the invention.

The principles and spirit of the present invention will be described below with reference to a number of exemplary embodiments. It should be understood that, those embodiments are given merely for those skilled in the art to better understand and thus implement the invention, and do not limit the scope of the invention in any way. On the contrary, those embodiments are provided to make the disclosure more thorough and complete, so that the scope of the disclosure may be completely conveyed to those skilled in the art.

It is known to those skilled in the art that, the embodiments of the invention may be implemented as a system, device, apparatus, method or computer program product. Thus, the present disclosure may be specifically implemented in the form of complete hardware, complete software (including firmware, resident software, microcode, etc.), or combination of hardware and software.

An application interface update method, apparatus, and system are proposed in accordance with the embodiments of the invention.

It is to be understood that, in this context, "button(s)" (e.g., tab(s)) means elements on an application interface which are capable of triggering and displaying a corresponding interface in response to actions; for example, a "button" may be used for triggering interface switching, and particularly, a "button" may be a shortcut for switching from an application interface to another. It will be appreciated that a "button" herein may be applicable to applications with application interfaces used by various devices. The devices to which applications using "button(s)" are applicable are not limited by the present invention. It will also be appreciated that "application interface update" herein refers primarily to the update of an application interface resulted from the change of buttons in the application interface, wherein, the change of buttons may be change of the buttons themselves, the number and/or arrangement of the buttons, which is not limited by the present invention either. Moreover, any number of elements in the drawings is intended to be illustrative rather than limiting, and any naming is used merely for distinguishing purpose without any meaning of limitation.

The principles and spirit of the present invention will be described in details below, with reference to a number of representative embodiments of the invention.

Briefing of the Invention

The inventors have found that, since the interfaces which can be triggered and displayed on an application interface of an application often needs to be frequently adjusted, update is often required for the application interface to achieve the adjustment of buttons on the interface. In the prior art, the application interface is updated by way of developing and releasing new versions, therefore new versions of the client need to be frequently developed and released for the application, which not only causes a massive amount of technical development, but also requires a user to frequently download and install new versions of the client, resulting in cumbersome user operation and waste of traffic.

Therefore, update to the interface by way of developing and releasing new versions in the prior art not only causes a massive amount of technical development, but also results in cumbersome user operation, which is a very annoying experience.

For this reason, a great need exists for an improved application interface update method and apparatus, such that there is no need to develop and release a new version for an application when updating an application interface for the adjustment of buttons, thereby reducing the amount of technical development and simplifying user operation.

Based on this, the basic idea of the present invention is that: for a client that has already been downloaded by a user, in order to avoid the massive amount of technical development and cumbersome user operation resulted from achieving the adjustment of buttons in an application interface by way of re-downloading new versions of a client developed on the basis of an updated application interface, the current application interface may be updated using interface update data on the server side or interface update data encapsulated in the client monitored during the running or startup of the client, respectively, to render the updated application interface. In this way, as the adjustment of buttons in the application interface only needs to update the application interface by the interface update data without re-downloading and installing new versions of the client developed on the basis of the updated application interface, therefore not only the amount of technical development required for the adjustment of buttons in the application interface is reduced, but also the user operation is simplified, and meanwhile traffic is saved for the user.

Having presented the basic principles of the present invention, various non-limiting embodiments of the invention will be described below.

Overview of Application Scenarios

First, referring to FIG. 1, a framework diagram of an exemplary application scenario of the embodiments of the invention is shown. Wherein, a user interacts with a server 101 through a client 102. It will be understood by those skilled in the art that the framework diagram as shown in FIG. 1 is only one example within which the embodiments of the invention may be implemented. The applicable scope of the embodiments of the invention is not limited by this framework in any respect.

It should be noted that the client 102 herein may be any client that is currently available, under development, or developed in the future, and is capable of interacting with the server 101 through any form of wired and/or wireless connection (e.g., Wi-Fi, LAN, cell network, coaxial cable, etc.), including but not limited to: a smartphone, a feature phone, a tablet computer, a laptop computer, a desktop computer, a small computer, a medium computer, a mainframe computer, etc. that is currently available, under development, or developed in the future. Alternatively, the client 102 may also be a software client, for example, an application installed on a hardware device such as a computer, a smartphone, a tablet computer, etc., which is very popular at present. More particularly, the client 102 may be the combination of the software client and the hardware client.

It should also be noted that the server 101 herein is only an example of devices (which may be software, hardware, firmware, or any combination thereof) capable of providing service to a user, which are currently available, under development, or developed in the future. There is no limitation to the embodiments of the invention in this respect.

Based on the framework shown in FIG. 1, in a first exemplary application scenario, the client 102 may monitor interface update data on the server 101 side during the running of the client 102; then, the client 102 may receive the monitored interface update data; finally, the client 102 updates the current application interface according to said interface update data, thereby rendering an updated application interface; wherein, buttons in said current application interface are different from buttons in said updated application interface, and/or the arrangement of buttons in said current application interface is different from the arrangement of buttons in said updated application interface.

Based on the framework shown in FIG. 1, in a second exemplary application scenario, the client 102 may obtain interface update data encapsulated in said client in response to monitoring that a triggering condition for interface update is met during the startup of the client 102; then, the client 102 may update the current application interface according to said interface update data, thereby rendering an updated application interface; wherein, buttons in said current application interface are different from buttons in said updated application interface, and/or the arrangement of buttons in said current application interface is different from the arrangement of buttons in said updated application interface.

According to the embodiments of the invention, for a client that has been downloaded by a user, the current application interface may be updated using interface update data on the server side monitored during the running of the client or interface update data encapsulated in the client to render an updated application interface, without the need for the user to re-download new versions of the client developed on the basis of the updated application interface and the need to continuously develop new versions of the client on the basis of the updated application interface, thereby not only significantly reducing the amount of technical development required for the adjustment of buttons in the application interface, but also simplifying user operation, while saving traffic and bringing about a better experience for the user.

Exemplary Methods

Methods for application interface update according to the exemplary embodiments of the invention will be described below with reference to FIGS. 2-6, in connection with the application scenarios in FIG. 1. It should be noted that, the above application scenarios are shown merely to facilitate the understanding of the spirit and principles of the invention, and there is no limitation to the embodiments of the invention in this respect. On the contrary, the embodiments of the invention may be applicable to any suitable scenario.

Figure 2:
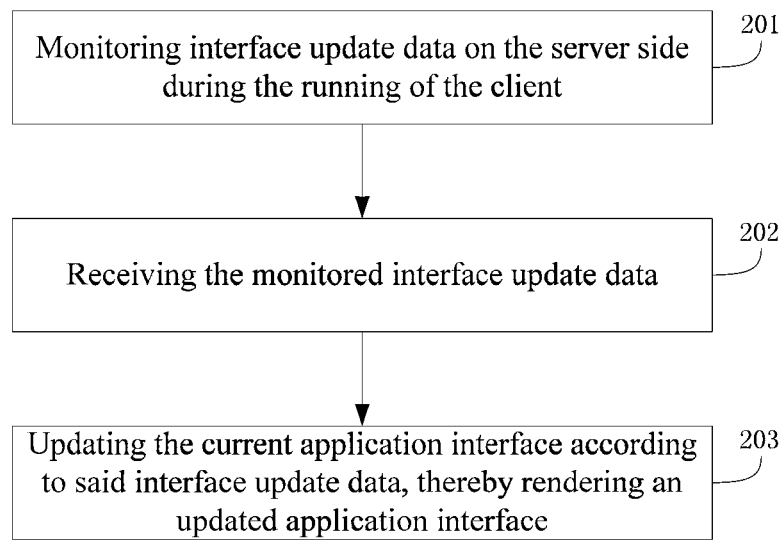
FIG. 2 schematically illustrates a flow diagram of an example of the application interface update method of the invention.

Referring to FIG. 2, there is shown a flow diagram of an example of the application interface update method of the invention. This example may be applied to the client, wherein, the example may, for example, include the following steps:

Step 201: monitoring interface update data on the server side during the running of the client.

Wherein, for a client that has already been downloaded onto a user equipment, it may monitor interface update data on the server side during the running thereof. For example, in some embodiments of the invention, the server side may actively push interface update date to the client when it is required to update the current application interface of the client, and the client may monitor whether the server side is pushing interface update data during the running of the client, and receive the interface update data when the interface update data is monitored. As another example, in some other embodiments of the invention, the client may monitor interface update data on the server side by way of actively querying the server for interface update data during the running of the client; if there happens to exist interface update data on the server, the interface update data may be received from the server.

It should be noted that data interaction between the client and the server is required for the client to achieve monitoring of the interface update data on the server side. In order to avoid excessively frequent interactions and excessive amount of data interacted between the client and the server resulting from frequent monitoring of the interface update data, in some embodiments of the invention, the interface update data on the server side may be monitored at a preset cycle. For example, in the embodiment in which the server actively pushes interface update data, the server can be made to send the interface update data to the client at a preset cycle without continuously sending it to the client. Accordingly, the client may also monitor the interface update data pushed by the server at the same cycle without continuously monitoring it during the running of the client. As another example, in the embodiment in which the client actively queries the server for interface update data, the client can be made to query the server for the interface update data at a preset cycle without continuously querying the server. Accordingly, the server may also monitor the query for interface update data sent from the client at the same cycle without continuously monitoring it.

Step 202: receiving the monitored interface update data.

After the interface update data is received, the interface update data may be used to update the current application interface it is directed to.

It should be noted that since the monitoring and reception of the interface update data are performed during the running of the client, the user is typically using the client when the interface update data is received. In order to avoid updating the application interface while the user is using the application thus interrupting the use of the user, in some embodiments of the invention, when the interface update data is received, the client may temporarily not preform application interface update indicated by the interface update data during the current running, and wait until the next startup of the client to perform the update. In particular, after step 202, the client saves said interface update data locally to the client in response to receiving the monitored interface update data, and reads said interface update data locally from the client in response to restarting of the client after the termination of the current running, thereby updating the current application interface according to said interface update data. That is, entering into step 203 after reading the interface update data. Furthermore, the interface update data may be specifically saved in a local cache of the client. In this way, not only the deterioration of user experience resulted from the application interface update performed during the use of the user can be avoided, but also the status before the update can be maintained in case of network abnormalities without causing the application interface being unavailable for use due to interruption of the update.

It will be appreciated that, in some embodiments of the invention, the client may also, after receiving the interface update data, perform application interface update indicated by the interface update data when a triggering condition for update indicated by the interface update data is met. For example, the interface update data may have a timer, and step 203 may be performed to achieve the application interface update indicated by the interface update data only when the update time preset in the timer is reached.

In addition, the two embodiments of triggering condition for update and restarting may be implemented in combination, for example, after the interface update data is received, if the client is running when the triggering condition for update is met, step 203 is not performed at this time, and will be performed at the next startup of the client.

Step 203: updating the current application interface according to said interface update data, thereby rendering an updated application interface.

Wherein, buttons in said current application interface are different from buttons in said updated application interface, and/or the arrangement of buttons in said current application interface is different from the arrangement of buttons in said updated application interface.

It will be appreciated that the application interface update of the present invention arises from the adjustment of buttons of the interface. Wherein, by comparison between the application interfaces before and after the update, those two either contain different buttons, or employ different arrangements of buttons, or contain different buttons and employ different arrangements of buttons at the same time. More particularly, by comparison between the current and updated application interfaces, the difference of those two may be reflected in the buttons themselves, the number of buttons, and/or the arrangement of buttons. That is, compared to the current application interface, the way the buttons in the updated application interface are adjusted may include adding, reducing, and/or altering the arrangement of the buttons.

Figure 3A:
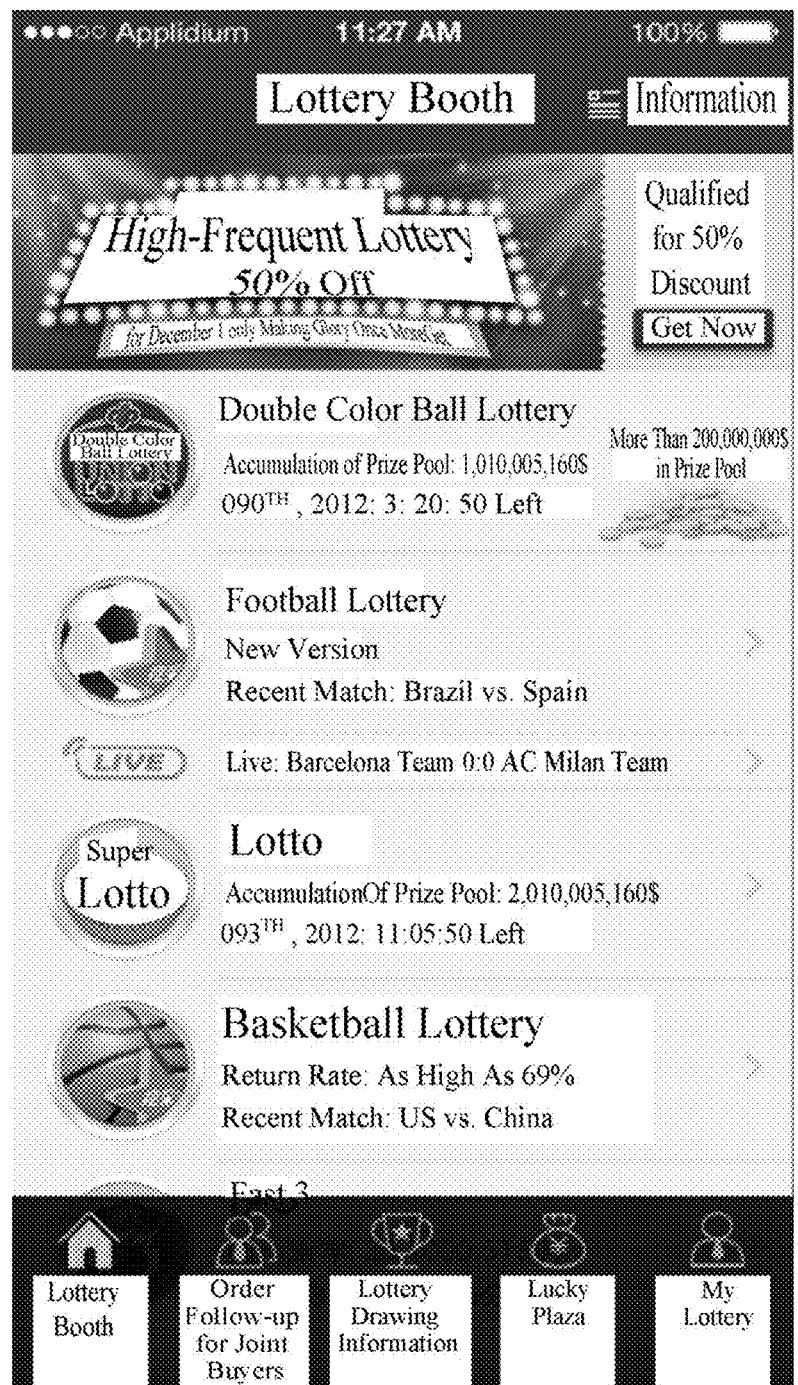
FIG. 3a schematically illustrates a current application interface according to an embodiment of the invention.
Figure 3B:
FIG. 3b schematically illustrates an updated application interface according to an embodiment of the invention.
Figure 3C:
FIG. 3c schematically illustrates a new interface according to an embodiment of the invention.

It should be noted that the adjustment to the buttons on the application interface is intended to adjust the interface that can be triggered and displayed by the user operating on the application interface through the adjustment of the buttons. In some embodiments of the invention, new buttons may be used for triggering new interfaces, wherein, the new buttons may be buttons which exist in said updated application interface and do not exist in said current application interface. The new interface may represent an interface that cannot be triggered and displayed on the current application interface, for example, the new interface may be an interface that is not displayed to the user before the update of the client but displayed to the user only after the update. For example, in a client of an application providing Internet lottery service, the current application interface before the update can be found in FIG. 3a, and the updated application interface after the update can be found in FIG. 3b. It can be seen from comparison between the two interfaces, the updated application interface has replaced an original button "Lucky Plaza 301" in the current application interface with a new button "World Cup 302", and also swapped the positions of the new button "World Cup 302" and an original button "Lottery Drawing Information 303". It can thus be seen that the update to the current application interface includes replacement of buttons and change of the arrangement of buttons. Furthermore, the new button "World Cup 302" in the updated application interface may be used for triggering a new interface "the World Cup" added in the client, as shown in FIG. 3c.

It will be appreciated that, regarding the change of the updated application interface with respect to the current application interface, the data required for the change may be obtained from the interface update data, or it may also be pre-encapsulated in the client to thereby be obtained locally from the client. Wherein, when the data required for the change is obtained from the interface update data, in addition to the data required for rendering the updated application interface, the interface update data may also include, when the new buttons appearing on the updated application interface are used for triggering and displaying interfaces not originally existed locally on the client, data required for rendering the interface triggered and thus displayed by those new buttons. In the aforementioned embodiment of the client providing Internet lottery service, the interface update data needs to not only include data for rendering "the World Cup" on the updated application interface, but also data supporting the application interface triggered by "the World Cup"—the data specifically shown on the interface of FIG. 3c.

As an example, said data required for rendering the updated application interface may be a dynamic parameter, for activating a corresponding module of a new button existing in the updated application interface, and deactivating a corresponding module of a button disappeared in the updated application interface.

For example, the dynamic parameter may be as follows:

```
Class OnlineParam
{
   String key;//unique identifier of parameter
      String value;//parameter value, supports JSON objects
      String desc;//parameter function description
      String updateTime;//parameter update cycle
   ......
}
The module may be as follows:
Class Bundle
{
   void start( );//start the module
      void stop( );//close the module
      void getID( );//unique identifier of the module
   ......
}
```

In some embodiments of the invention, the updated application interface is only applicable to a particular situation in certain application scenarios, and the client needs to change the updated application interface back to the current application interface after such particular situation is over. In particular, after the completion of step 203, the updated application interface may be changed back to the current application interface according to a triggering instruction of said server to terminate said updated application interface. Wherein, the triggering instruction of the server to terminate said updated application interface may be included in the interface update data to be sent in advance to the client, in which case the triggering instruction may specifically be a termination condition of the updated application interface, so that the client may change the updated application interface back to the current application interface when it is found that the termination condition is met after the completion of the update. Alternatively, the triggering instruction of the server to terminate said updated application interface may also be sent to the client by the server when the updated application interface needs to be terminated, so that the client may change the updated application interface back to the current application interface when this triggering instruction is received.

In addition, in the invention, the actions of the client performed for application interface update may be encapsulated together, so as to ensure that the actions of the client performed for application interface update are functionally independent, thereby reducing the coupling between the application interface update function and the main function of the application to facilitate code management.

With the technical solution of the invention, since the adjustment to the buttons in the application interface only requires update of the application interface through the interface update data, there is no need to re-download and install a new version of the client developed on the basis of the updated application interface, thereby not only reducing the amount of technical development required for the adjustment of buttons in the application interface, but also simplifying user operation while saving traffic for the user.

Furthermore, by updating the application interface through the interface update data sent from the server to the client, the server can adjust the buttons on the application interface at any time with flexibility, thereby facilitating the provider of the application to flexibly adjust the application interface.

Figure 4:
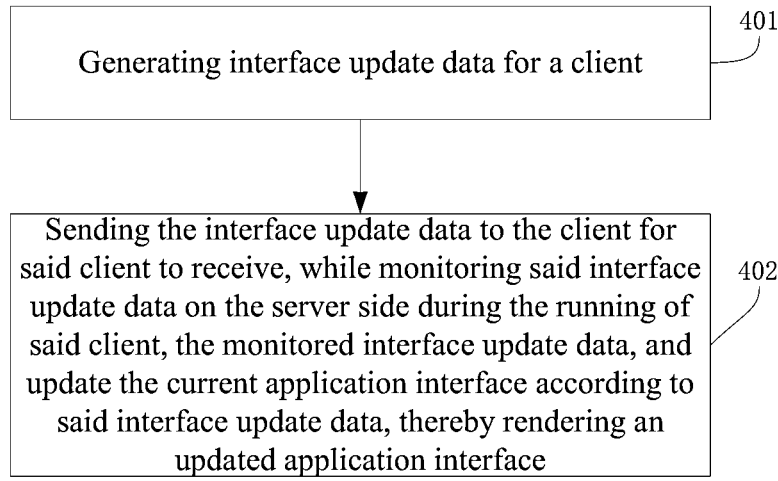
FIG. 4 schematically illustrates a flow diagram of another example of the application interface update method of the invention.

Referring to FIG. 4, there is shown a flow diagram of another example of the application interface update method of the invention. This example corresponds to the aforementioned example as shown in FIG. 2, and may be applied to a server, wherein, the example may, for example, include the following steps:

Step 401: generating interface update data for a client.

Step 402: sending the interface update data to the client for said client to receive, while monitoring said interface update data on the server side during the running of said client, the monitored interface update data, and update the current application interface according to said interface update data, thereby rendering an updated application interface.

Wherein, buttons in said current application interface are different from buttons in said updated application interface, and/or the arrangement of buttons in said current application interface is different from the arrangement of buttons in said updated application interface.

It should be noted that, for a client that has already been downloaded onto a user equipment, it may monitor interface update data on the server side during the running thereof. For example, in some embodiments of the invention, the server side may actively push interface update date to the client when it is required to update the current application interface of the client, and the client may monitor whether the server side is pushing interface update data during the running of the client, and receive interface update data when the interface update data is monitored. As another example, in some other embodiments of the invention, the client may monitor interface update data on the server side by way of actively querying the server for interface update data during the running of the client; if there happens to exist interface update data on the server, the interface update data may be received from the server.

It will be appreciated that data interaction between the client and the server is required for the client to achieve monitoring of the interface update data on the server side. In order to avoid excessively frequent interactions and excessive amount of data interacted between the client and the server resulting from frequent monitoring of the interface update data, in some embodiments of the invention, the interface update data on the server side may be monitored at a preset cycle. For example, in the embodiments in which the server actively pushes interface update data, the server can be made to send the interface update data to the client at a preset cycle without continuously sending it to the client. Accordingly, the client may also monitor the interface update data pushed by the server at the same cycle without continuously monitoring it during the running of the client. As another example, in the embodiments in which the client actively queries the server for interface update data, the client can be made to send query request for interface update data to the server at a preset cycle without continuously sending it to the server. Accordingly, the server may also monitor the query request for interface update data sent from the client at the same cycle without continuously monitoring it.

Furthermore, in some embodiments of the invention, the updated application interface is only applicable to a particular situation in certain application scenarios, and the client needs to change the updated application interface back to the current application interface after such particular situation is over. In particular, in this example, the server may also generate a triggering instruction to terminate the updated application interface for the client to change said updated application interface back to said current application interface according to said triggering instruction. Wherein, the triggering instruction of the server to terminate said updated application interface may be included in the interface update data to be sent in advance to the client, in which case the triggering instruction may specifically be a termination condition of the updated application interface. The client may change the updated application interface back to the current application interface when it is found that the termination condition is met after the completion of the update. Alternatively, the triggering instruction of the server to terminate said updated application interface may also be sent to the client by the server when the updated application interface needs to be terminated, so that the client may change the updated application interface back to the current application interface when this triggering instruction is received.

With the technical solution of the example, since the adjustment to the buttons in the application interface only requires update of the application interface through the interface update data, there is no need to re-download and install a new version of the client developed on the basis of the updated application interface, thereby not only reducing the amount of technical development required for the adjustment of buttons in the application interface, but also simplifying user operation while saving traffic for the user.

Figure 5:
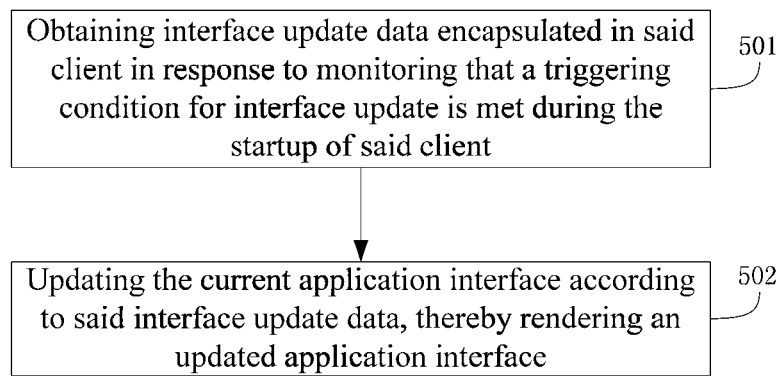
FIG. 5 schematically illustrates a flow diagram of another example of the application interface update method of the invention.

Referring to FIG. 5, there is shown a flow diagram of another example of the application interface update method of the invention. This example differs from the aforementioned examples shown in FIGS. 2 and 4 in that, in the examples shown in FIGS. 2 and 4, a client that has already been downloaded and installed on a user equipment obtains interface update data from a server to update an application interface, whereas the interface update data in this example is encapsulated in advance within a client so that the interface update data is obtained locally from the client when an application interface is updated. In particular, this example may be applied to a client, and may particularly include, for example, the following steps:

Step 501: obtaining interface update data encapsulated in said client in response to monitoring that a triggering condition for interface update is met during the startup of said client.

Wherein, the triggering condition for interface update indicates a situation to use update application interface. For example, the triggering condition for interface update may be a preset update time, and there may be a timer set in accordance with the update time in the client such that when the update time preset in the timer is reached, the triggering condition for interface update is met, therefore triggering the obtaining of the interface update data.

It should be noted that, in some embodiments of the invention, the triggering condition for interface update may be pre-encapsulated in the client along with the interface update data.

Step 502: updating the current application interface according to said interface update data, thereby rendering an updated application interface.

Wherein, buttons in said current application interface are different from buttons in said updated application interface, and/or the arrangement of buttons in said current application interface is different from the arrangement of buttons in said updated application interface.

With the technical solution of the example, since the adjustment to the buttons in the application interface only requires update of the application interface through the interface update data, there is no need to re-download and install a new version of the client developed on the basis of the updated application interface, thereby not only reducing the amount of technical development required for the adjustment of buttons in the application interface, but also simplifying user operation while saving traffic for the user.

Furthermore, by updating the application interface with the interface update data pre-encapsulated in the client, the amount of data that needs to be obtained from the server by the client when adjusting the buttons on the application interface may be reduced, thereby avoiding response delay of the application interface update resulted from downloading the interface update data.

It should also be noted that since this example and the aforementioned examples share many identical or similar contents, the relevant contents which have already been disclosed in the aforementioned examples may be referenced to the aforementioned examples, and are not be repeated in this example.

Exemplary Apparatus

Having presented the exemplary methods of the invention, exemplary apparatuses for application interface update of the invention will then be described with reference to FIGS. 6-9.

Figure 6:
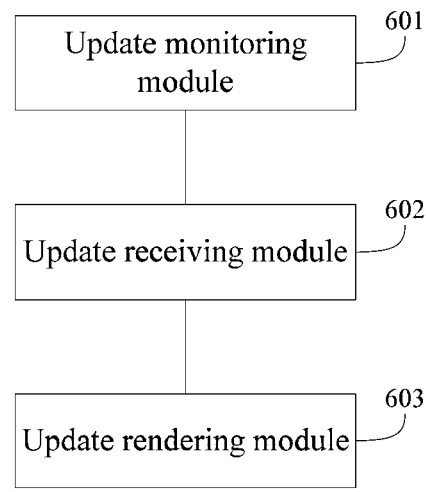
FIG. 6 schematically illustrates a structure diagram of an example of the application interface update apparatus of the invention.

Referring to FIG. 6, there is shown a structure diagram of an example of the application interface update apparatus of the invention. The apparatus of the example may be configured on a client, and for example, may specifically include:

an update monitoring module 601 for monitoring interface update data on the server side during the running of the client;

an update receiving module 602 for receiving the monitored interface update data; and an update rendering module 603 for updating the current application interface according to said interface update data, thereby rendering an updated application interface;

wherein, buttons in said current application interface are different from buttons in said updated application interface, and/or the arrangement of buttons in said current application interface is different from the arrangement of buttons in said updated application interface.

Optionally, in some embodiments of the invention, there exist, in said updated application interface, new buttons which do not exist in said current application interface, wherein said new buttons are used for triggering new interfaces.

Optionally, in some other embodiments of the invention, in addition to all of the modules shown in FIG. 6, said apparatus may also include:

an update saving module for saving said interface update data locally to said client in response to receiving said monitored interface update data; and an update reading module for reading out said interface update data locally from said client in response to restarting said client after the termination of the current running, thereby updating the current application interface according to said interface update data.

Wherein, further optionally, said interface update data may be specifically saved in a local cache of said client.

Optionally, in some other embodiments of the invention, in addition to all of the modules shown in FIG. 6, said apparatus may also include:

a changing back module for changing said updated application interface back to said current application interface according to a triggering instruction of said server to terminate said updated application interface.

Optionally, in some other embodiments of the invention, said update monitoring module may be specifically used for monitoring said interface update data on the server side at a preset cycle.

Figure 7:
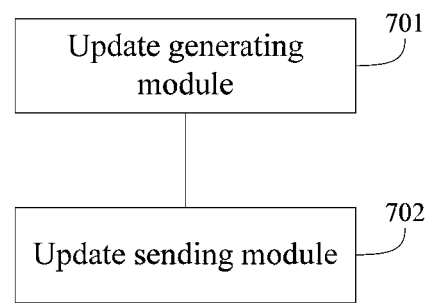
FIG. 7 schematically illustrates a structure diagram of another example of the application interface update apparatus of the invention.

Referring to FIG. 7, there is shown a structure diagram of another example of the application interface update apparatus of the invention. The apparatus of the example may be configured on a server, and for example, may specifically include:

an update generating module 701 for generating interface update data for a client; and an update sending module 702 for sending the interface update data to said client for said client to receive, while monitoring said interface update data on the server side during the running of said client, the monitored interface update data, and update the current application interface according to said interface update data, thereby rendering an updated application interface;

wherein, buttons in said current application interface are different from buttons in said updated application interface, and/or the arrangement of buttons in said current application interface is different from the arrangement of buttons in said updated application interface.

Optionally, in some embodiments of the invention, in addition to all of the modules shown in FIG. 7, said apparatus may also include:

a termination instruction generating module for generating a triggering instruction to terminate the updated application interface to enable said client to change said updated application interface back to said current application interface according to said triggering instruction.

Figure 8:
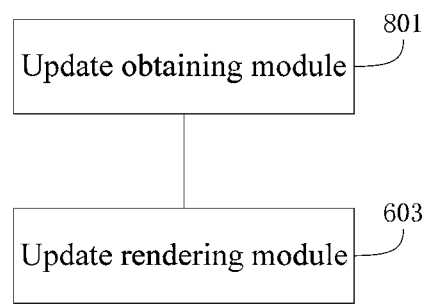
FIG. 8 schematically illustrates a structure diagram of another example of the application interface update apparatus of the invention.

Referring to FIG. 8, there is shown a structure diagram of another example of the application interface update apparatus of the invention. The apparatus of the example may be configured on a client, and for example, may specifically include:

an update obtaining module 801 for obtaining interface update data encapsulated in said client in response to monitoring that a triggering condition for interface update is met during the startup of said client; and the update rendering module 603 for updating the current application interface according to said interface update data, thereby rendering an updated application interface;

wherein, buttons in said current application interface are different from buttons in said updated application interface, and/or the arrangement of buttons in said current application interface is different from the arrangement of buttons in said updated application interface.

Figure 9:
FIG. 9 schematically illustrates a structure diagram of an example of the application interface update system of the invention.

Referring to FIG. 9, there is shown a structure diagram of an example of the application interface update system of the invention. In the example, said system, for example, may specifically include a client 901 and a server 902. Wherein, said client 901 is configured with the aforementioned apparatus shown in FIG. 6, and the server 902 is configured with the aforementioned apparatus shown in FIG. 7.

With the apparatus and system provided by the embodiments of the invention, since the adjustment to the buttons in the application interface only requires update of the application interface through the interface update data, there is no need to re-download and install a new version of the client developed on the basis of the updated application interface, thereby not only reducing the amount of technical development required for the adjustment of buttons in the application interface, but also simplifying user operation while saving traffic for the user.

It should be noted that, although a number of modules or sub-modules of the application interface update apparatus have been set forth in the above detailed description, such division is non-mandatory. In fact, the features and functionalities of two or more of the modules described above may be embodied in a single module, in accordance with the embodiments of the invention. Conversely, the features and functionalities of a single module described above may be further divided to be embodied by a plurality of modules.

Moreover, although the operations of the method of the present invention have been described in a specific order in the drawing, this does not require or imply that those operations are necessarily performed in such specific order, or that all of the illustrated operations have to be performed to achieve desired result. Additionally or alternatively, certain steps may be omitted, a plurality of steps may be combined and performed in a single step, and/or a single step may be divided into and performed in a plurality of steps.

Although the principles and spirit of the present invention have been described with reference to a number of specific embodiments, it should be understood that the present invention is not limited to the disclosed specific embodiments, and the division of various aspects does not mean that features in those aspects cannot be combined, and such division is merely for the convenience of presentation. The present invention is intended to cover various modifications and equivalent arrangements within the spirit and scope of the appended claims.

What is claimed is:

1. A method applied to a client implemented by one or more processing devices and one or more non-transitory machine-readable media having instructions stored therein such that when executed, the one or more processing devices perform:

monitoring interface update data on the server side during the running of the client;

receiving the monitored interface update data;

updating the current application interface according to said interface update data, thereby rendering an updated application interface without re-downloading and installing new versions of the client developed on the basis of the updated application interface; and changing said updated application interface back to said current application interface according to a triggering instruction of said server to terminate said updated application interface, wherein the triggering instruction of said server is comprised in the interface update data to be sent in advance to the client, the triggering instruction of said server includes a termination condition of the updated application interface, and said updated application interface is changed back to said current application interface when the termination condition is met after the completion of the updating, wherein, the updating of the current application interface includes adding a new button into said current application interface, cancelling an existed button from said current application interface, and/or adjusting the arrangement of buttons in said updated application interface, wherein said interface update data includes a dynamic parameter for activating a module corresponding to the added new button or deactivating a module corresponding to the cancelled button, wherein there exists, in said updated application interface, a new button which does not exist in said current application interface, wherein said new button is used for triggering a new interface, and wherein said interface update data comprises a timer, and updating the current application interface comprises updating the current application interface when the update time preset in said timer is reached.

2. The method according to claim 1, further comprising:
saving said interface update data locally to said client in response to receiving the monitored interface update data; and
reading said interface update data locally from said client in response to restarting the running of said client after the termination of the current running, thereby updating the current application interface according to said interface update data.

3. The method according to claim 2, wherein said interface update data is specifically saved in a local cache of said client.

4. The method according to claim 1, wherein said monitoring interface update data on the server side is specifically monitoring said interface update data on the server side at a preset cycle.

5. A method applied to a client implemented by one or more processing devices and one or more non-transitory machine-readable media having instructions stored therein such that when executed, the one or more processing devices perform:

obtaining interface update data encapsulated in said client in response to monitoring that a triggering condition for interface update is met during the startup of said client;

updating the current application interface according to said interface update data, thereby rendering an updated application interface without re-downloading and installing new versions of the client developed on the basis of the updated application interface; and changing said updated application interface back to said current application interface according to a triggering instruction of said server to terminate said updated application interface, wherein the triggering instruction of said server is comprised in the interface update data to be sent in advance to the client, the triggering instruction of said server includes a termination condition of the updated application interface, and said updated application interface is changed back to said current application interface when the termination condition is met after the completion of the updating, wherein, the updating of the current application interface includes adding a new button into said current application interface, cancelling an existed button from said current application interface, and/or adjusting the arrangement of buttons in said updated application interface, wherein said interface update data includes a dynamic parameter for activating a module corresponding to the added new button or deactivating a module corresponding to the cancelled button, wherein there exists, in said updated application interface, a new button which does not exist in said current application interface, wherein said new button is used for triggering a new interface, and wherein said interface update data comprises a timer, and updating the current application interface comprises updating the current application interface when the update time preset in said timer is reached.

6. An apparatus configured on a client, comprising:
one or more processing devices; and
one or more non-transitory machine-readable media configured to store instructions that are executable by the one or more processing devices to perform operations comprising:

monitoring interface update data on the server side during the running of the client;

receiving the monitored interface update data;

updating the current application interface according to said interface update data, thereby rendering an updated application interface without re-downloading and installing new versions of the client developed on the basis of the updated application interface; and changing said updated application interface back to said current application interface according to a triggering instruction of said server to terminate said updated application interface, wherein the triggering instruction of said server is comprised in the interface update data to be sent in advance to the client, the triggering instruction of said server includes a termination condition of the updated application interface, and said updated application interface is changed back to said current application interface when the termination condition is met after the completion of the updating, wherein, the updating of the current application interface includes adding a new button into said current application interface, cancelling an existed button from said current application interface, and/or adjusting the arrangement of buttons in said updated application, wherein said interface update data includes a dynamic parameter for activating a module corresponding to the added new button or deactivating a module corresponding to the cancelled button, wherein there exists, in said updated application interface, a new button which does not exist in said current application interface, wherein said new button is used for triggering a new interface, and wherein said interface update data comprises a timer, and updating the current application interface comprises updating the current application interface when the update time preset in said timer is reached.

7. The apparatus according to claim 6, wherein the one or more non-transitory machine-readable media is further configured to store instructions that are executable by the one or more processing devices to perform operations comprising:

saving said interface update data locally to said client in response to receiving the monitored interface update data; and reading said interface update data locally from said client in response to restarting the running of said client after the termination of the current running, thereby updating the current application interface according to said interface update data.

8. The apparatus according to claim 7, wherein said interface update data is specifically saved in a local cache of said client.

9. The apparatus according to claim 6, wherein the one or more non-transitory machine-readable media is further configured to store instructions that are executable by the one or more processing devices to monitor interface update data on the server side by monitoring said interface update data on the server side at a preset cycle.

* * * * *